United States Patent
Hirano et al.

(10) Patent No.: US 9,086,858 B2
(45) Date of Patent: Jul. 21, 2015

(54) SYSTEM, METHOD AND APPARATUS FOR DISK DRIVE FLUID DYNAMIC BEARING

(71) Applicant: HGST Netherlands B.V., Amsterdam (NL)

(72) Inventors: Toshiki Hirano, San Jose, CA (US); Lidu Huang, Danville, CA (US); Chiao-Ping Ku, Fremont, CA (US); Gwo-Jeng Lo, Cupertino, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/091,189

(22) Filed: Nov. 26, 2013

(65) Prior Publication Data

US 2015/0146366 A1 May 28, 2015

(51) Int. Cl.
*G06F 1/18* (2006.01)
*G11B 5/60* (2006.01)

(52) U.S. Cl.
CPC .............. *G06F 1/187* (2013.01); *G11B 5/6005* (2013.01)

(58) Field of Classification Search
USPC ....................................................... 360/99.08
See application file for complete search history.

(56) References Cited

U.S. PATENT DOCUMENTS

| | | | |
|---|---|---|---|
| 6,771,460 B2 | 8/2004 | Nii et al. | |
| 6,979,923 B2 | 12/2005 | Nishio | |
| 7,021,829 B2 | 4/2006 | Tamaoka | |
| 7,135,797 B2 | 11/2006 | Khan et al. | |
| 7,262,935 B2 * | 8/2007 | LeBlanc | 360/99.08 |
| 8,366,322 B2 | 2/2013 | Hibi et al. | |
| 8,385,017 B2 * | 2/2013 | Mizukami et al. | 360/99.08 |
| 8,395,861 B2 | 3/2013 | Tashiro | |
| 8,520,335 B2 * | 8/2013 | Mizukami et al. | 360/99.08 |
| 8,587,895 B1 * | 11/2013 | Sumiji et al. | 360/99.08 |
| 8,630,063 B2 * | 1/2014 | Sumiji et al. | 360/99.08 |
| 8,675,304 B2 * | 3/2014 | Tamaoka et al. | 360/99.08 |
| 8,724,257 B2 * | 5/2014 | Sekii et al. | 360/99.08 |
| 8,773,815 B2 * | 7/2014 | Aoshima | 360/99.08 |
| 2007/0222314 A1 | 9/2007 | Drautz | |
| 2008/0075398 A1 | 3/2008 | Kimura et al. | |

OTHER PUBLICATIONS

Thitima Jintanawan, "Vibration of hard disk drive spindle systems with distributed journal bearing forces", Microsyst Technol (2006) 12: 208-218, 11 pages.

\* cited by examiner

*Primary Examiner* — Wayne Young
*Assistant Examiner* — Mark Blouin

(57) ABSTRACT

A disk drive can include an enclosure and a media disk rotatably mounted to the enclosure via a spindle. A fluid dynamic bearing (FDB) can be mounted between the enclosure and the spindle of the media disk. The FDB may include an integrally formed shaft and lower thrust bush formed together from a single material.

18 Claims, 5 Drawing Sheets

SYSTEM, METHOD AND APPARATUS FOR DISK DRIVE FLUID DYNAMIC BEARING

BACKGROUND OF THE INVENTION

1. Field of the Disclosure

The present invention relates in general to disk drives and, in particular, to a system, method and apparatus for a fluid dynamic bearing for a hard disk drive.

2. Description of the Related Art

Hard disk drives (HDD) typically utilize a bearing upon which one or more magnetic media disks is supported and rotated. One type of bearing is known as a tied-shaft fluid dynamic bearing (FDB). These types of designs are usually employed for structural rigidity in heavy-loaded HDDs, such as those HDDs with two or more disks, or HDDs with large form factors.

Two types of tied-shaft FDB designs are currently popular. FIG. 1 depicts a conical-shaped design and FIG. 2 depicts a spool type design. For the conical shaped FDB 11, both the top and bottom cone surfaces 13, 15 have a large curvature. When the rotating parts (i.e., the bearing sleeves 17, 19) contact the stationary parts (i.e., the cones 13, 15, respectively) during motor spin down, the parts contact each other along a line instead of along their surfaces. This design reduces wear of the parts over a lifetime of numerous starts-stops during HDD operation. The manufacturing tolerance, such as the parallelism of the cones and bearing sleeves, may have a lesser impact on bearing wear since the curvature of the cone surface reduces the possibility of the surface contact.

In contrast, the spool type design 21 in FIG. 2 has a thrust bearing 23 (i.e., the rotating part) that always makes surface contact with the thrust bush 25 (i.e., the stationary part). Moreover, during assembly, the lower thrust bush 27 is always either loose fit or tight fit to the shaft 29 to a prescribed location to form the bottom thrust bearing. After assembly, the bottom thrust bearing tolerance control of the perpendicularity is limited by the loose or tight fit process. To avoid thrust bearing seizure during contact between the stationary and rotating parts under an unexpected external force, the material used to form the bottom bearing bush material is often a relative soft material, such as bronze or brass. The top thrust bush is not affected since it can be made as a single item. The perpendicularity of the shaft and thrust bush can be better controlled than the loose or tight fit assembly of the lower thrust bearing.

Moreover, the spool type tied-shaft FDB design is available only for a 2.5 inch form factor HDD. For a heavier-loaded 3.5 inch form factor, the reliability of the FDB is substantially unacceptable due to excessive wear between the bottom thrust bearing and bush. Accordingly, improvements in heavy-loaded FDB design continue to be of interest.

SUMMARY

Embodiments of a system, method and apparatus for a FDB for a hard disk drive are disclosed. For example, a disk drive can include an enclosure and a media disk rotatably mounted to the enclosure. A fluid dynamic bearing (FDB) can be mounted between the enclosure and the media disk. The FDB may include an integrally formed shaft and lower thrust bush formed together from a single material.

In other embodiments, the disk drive may comprise an enclosure having a base with a nest extending therefrom, and a top cover coupled to the base. A plurality of media disks may be rotatably mounted to the enclosure. Each media disk can have a form factor of at least about 3.5 inches. The FDB may be mounted between the enclosure and the plurality of media disks. The FDB may comprise an integrally formed shaft and lower thrust bush. The shaft and lower thrust bush may be seated in the nest.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
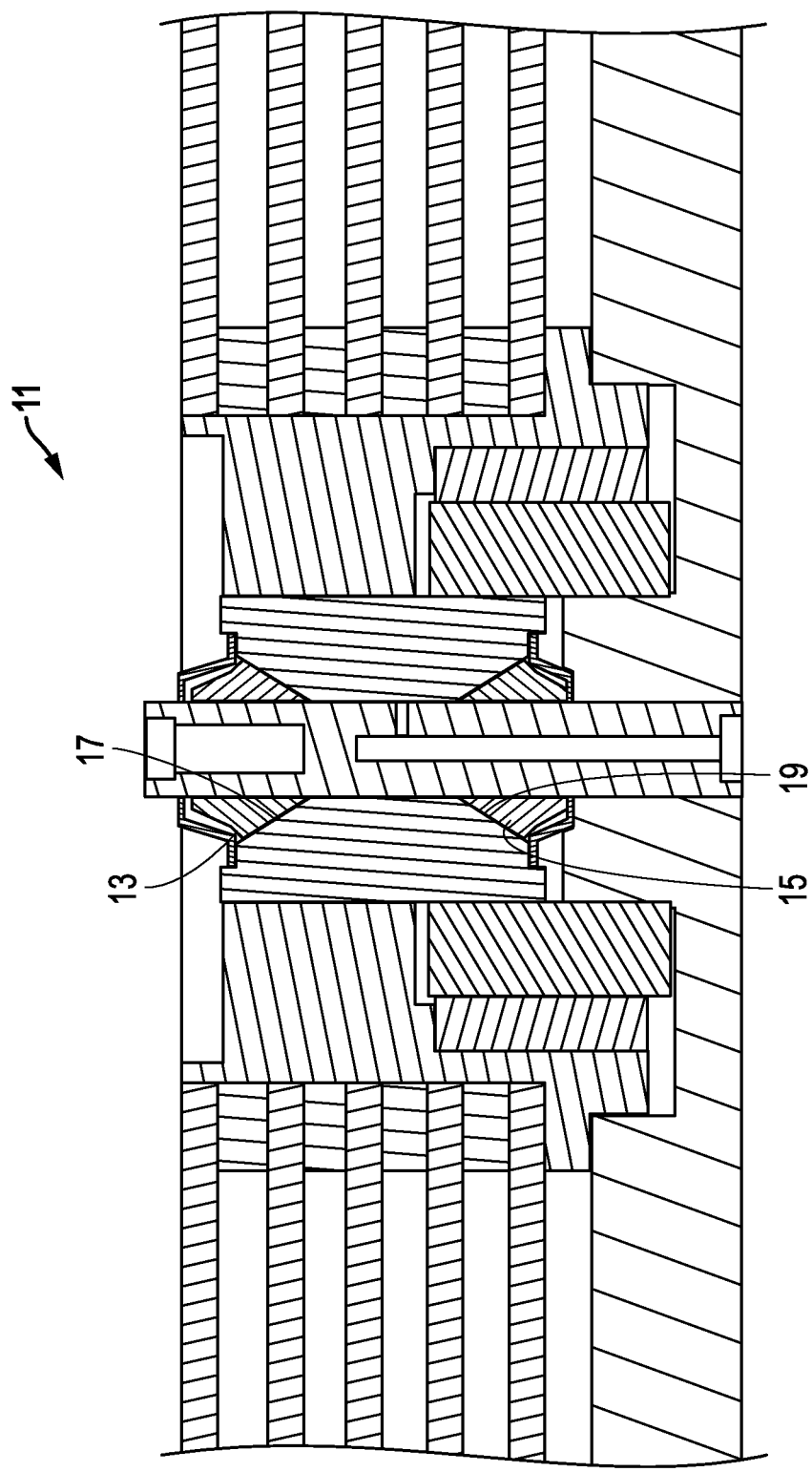
FIG. 1 is a schematic, sectional side view of a conventional hard disk drive design.
Figure 2:
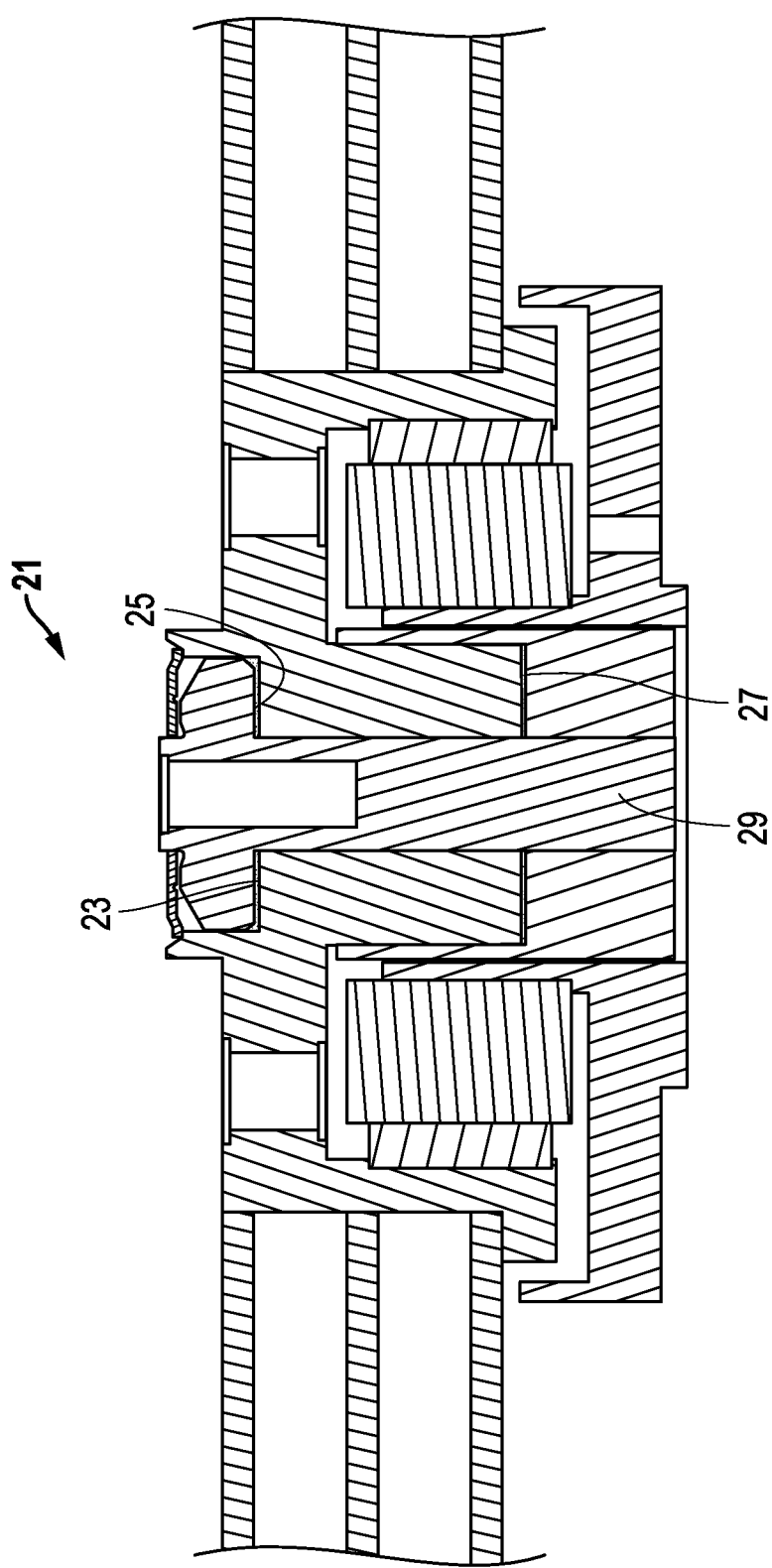
FIG. 2 is a schematic, sectional side view of a conventional hard disk drive design.
Figure 3:
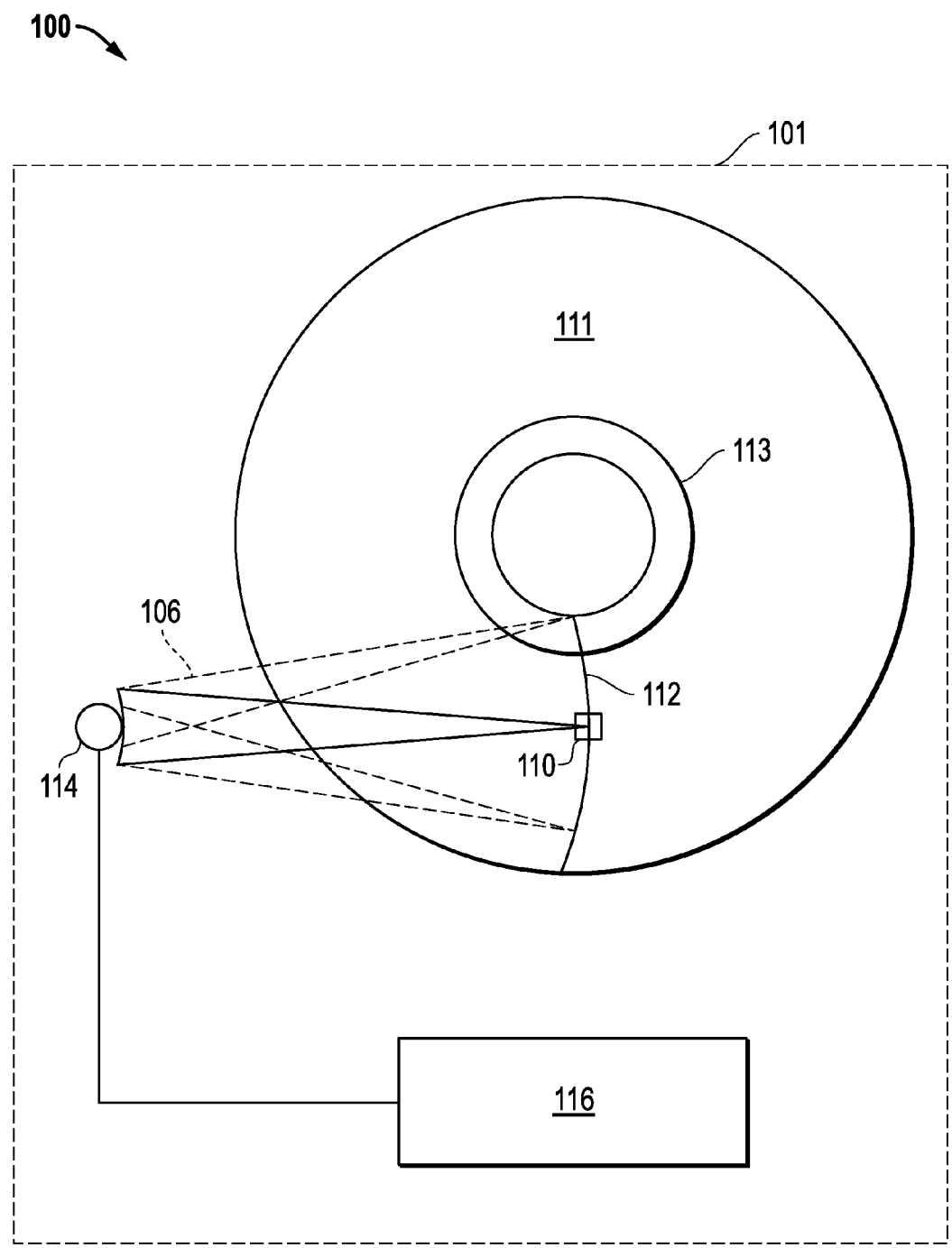
FIG. 3 is schematic plan view of an embodiment of a disk drive.
Figure 4:
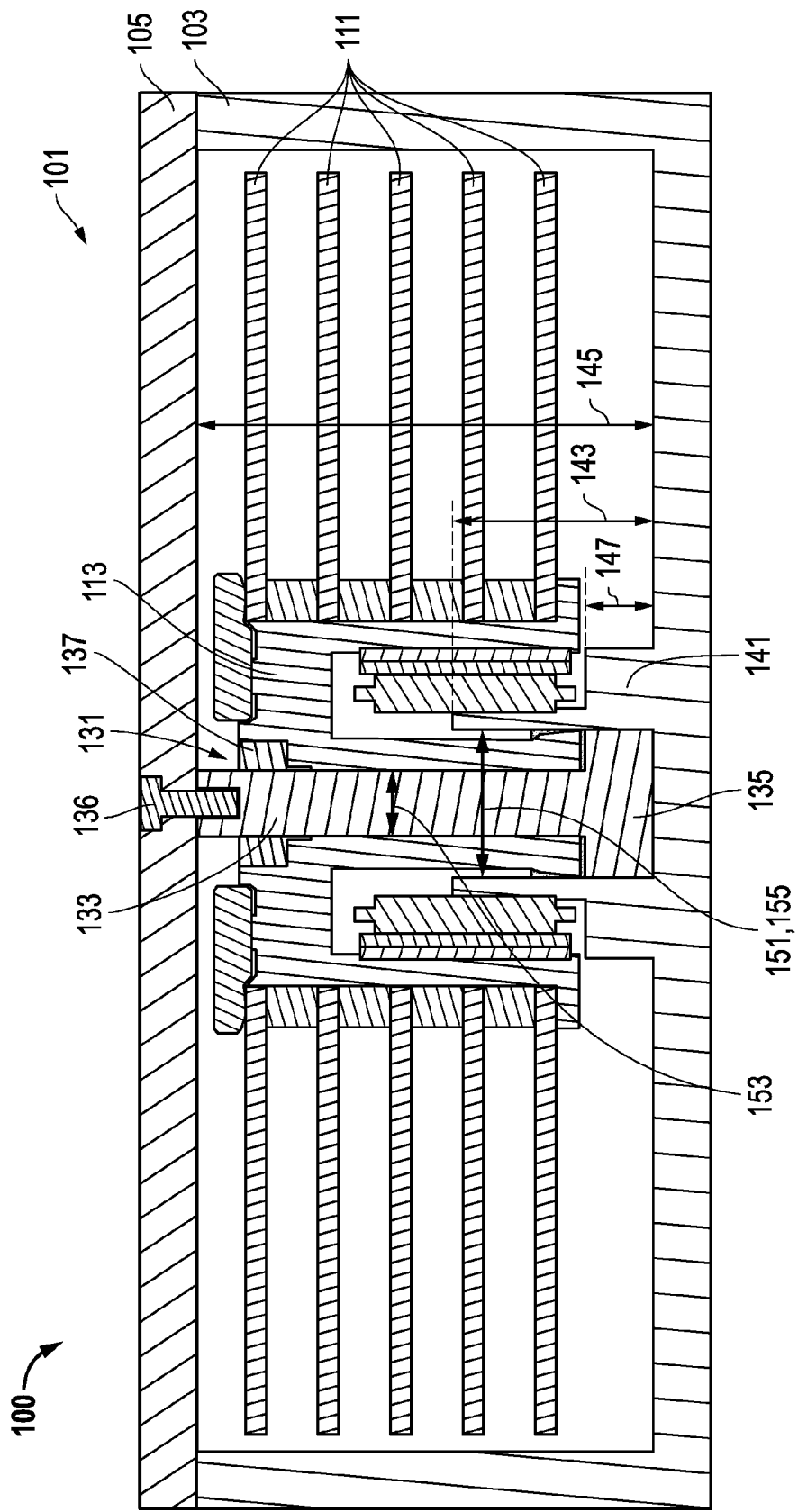
FIG. 4 is a schematic sectional side view of an embodiment of a hard disk drive.

Embodiments of a system, method and apparatus for a disk drive are disclosed. For example, as shown in FIGS. 3 and 4, a disk drive 100 may comprise a housing or enclosure 101. The enclosure 101 may include a base 103 and a top cover 105.

At least one media disk 111 may be rotatably mounted to the enclosure 101. The disk(s) 111 may comprise magnetic recording media as is known in the art. The media disks 111 may include a plurality of media disks in a range of about 2 media disks to about 10 media disks. The media disks 111 may comprise a form factor in excess of 2.5 inches to about 15 inches. For example, the media disks 111 may comprise a form factor of at least about 3.5 inches.

As shown in FIG. 4, a fluid dynamic bearing (FDB) 131 may be mounted between the enclosure 101 and the media disks 111. The FDB 131 may comprise an integrally formed shaft 133 and lower thrust bush 135. Embodiments of the shaft 133 and lower thrust bush 135 may be formed together from a single material. For example, the single material can include a material having a Young's modulus of at least about 2 E8 N/m$^2$, such as steel. In some embodiments, the shaft 133 and lower thrust bush 135 are not separate parts that are joined together, and they are not formed from different materials.

Embodiments of the FDB 131 may include a tied-shaft FDB, such that the shaft 133 is mounted to both the base 103 and the top cover 105. For example, the shaft 133 may be press fit to the base 103 and further secured with adhesive, welding, etc. In addition, the shaft 133 may be secured to the top cover 105 with a fastener, such as a screw 136.

Figure 5:
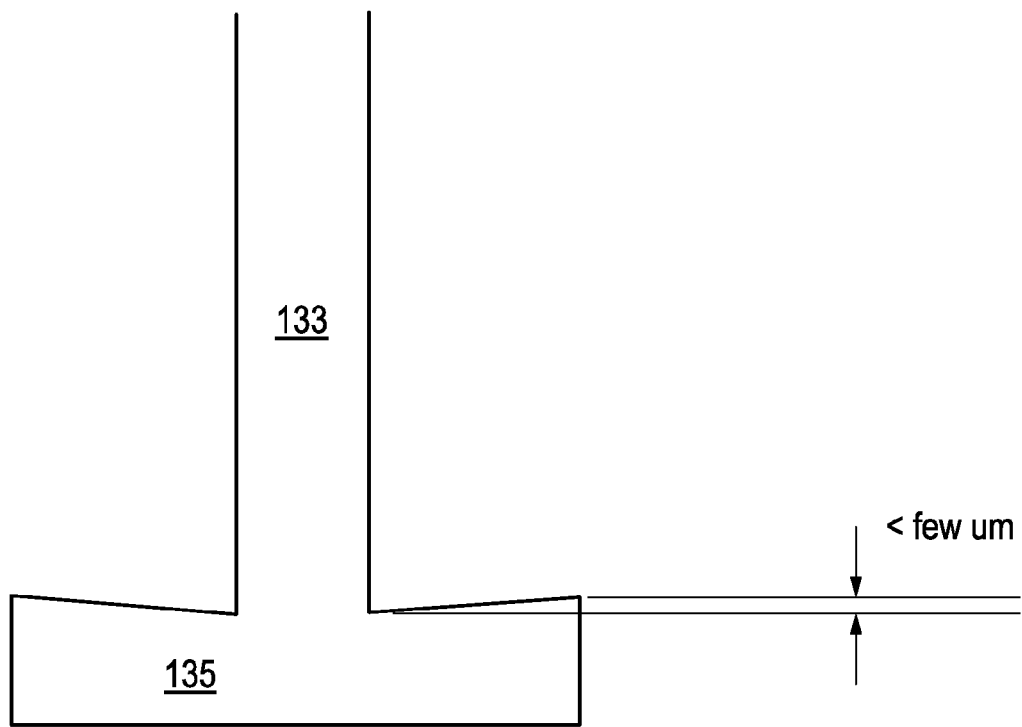
FIG. 5 is a schematic side view of an embodiment of a shaft and lower thrust bush.

In some versions (FIG. 5), a perpendicularity between the shaft 133 and the lower thrust bush 135 comprises a runout of a few micrometers from the outer diameter to the inner diameter of a thrust plate.

Embodiments of the FDB 131 may further comprise a top thrust bearing 137 formed from a second material that is softer than the material used to form the shaft 133 and lower thrust bush 135. For example, the second material may comprise bronze, brass or a combination thereof. Embodiments of the top thrust bearing 137 may comprise a top thrust bush ring having either a loose fit or a tight fit on an upper portion of the shaft 133.

In other embodiments, the media disks 133 may be mounted to the spindle 113. The spindle 113 may be rotatably mounted to the FDB 131. In some versions, the enclosure 101 may comprise a nest 141 extending from the base 103. The shaft 133 and lower thrust bush 135 may be seated in the nest 141. In some embodiments, a portion of the spindle 113 can extend between the shaft 133 and the nest 141.

Embodiments of the abutting surfaces of the nest 141 and the shaft 133 and lower thrust bearing 135 are not conical and can be substantially perpendicular. Embodiments of the nest 141 may include has a nest axial dimension 143 that is less than an axial dimension 145 of the shaft 133. In some versions, the nest axial dimension 143 can be greater than an axial dimension 147 of the lower thrust bush 135.

Embodiments of the nest 141 may include a nest inner radial dimension 151. The shaft 133 may include a shaft outer radial dimension 153 that is less than the nest inner radial dimension 151. The lower thrust bush 135 may include a bush outer radial dimension that 155 that is substantially similar to the nest inner radial diameter 151.

In still other embodiments, the disk drive may comprise an enclosure having a base with a nest extending therefrom, and a top cover coupled to the base. A plurality of media disks may be rotatably mounted to the enclosure. Each media disk can have a form factor of at least about 3.5 inches. A FDB may be mounted between the enclosure and the plurality of media disks. The FDB may comprise an integrally formed shaft and lower thrust bush. The shaft and lower thrust bush may be seated in the nest.

Embodiments of the FDB may include a tied-shaft FDB, such that the shaft is mounted to both the base and the top cover. Versions of the abutting surfaces of the nest and the shaft and lower thrust bearing can be substantially perpendicular. Embodiments of the nest can have a nest axial dimension that is less than an axial dimension of the shaft, and greater than an axial dimension of the lower thrust bush.

Other embodiments of the nest can have a nest inner radial dimension, the shaft can have a shaft outer radial dimension that is less than the nest inner radial dimension, and the lower thrust bush can have a bush outer radial dimension that is substantially similar to the nest inner radial diameter. In another version, the formed shaft and lower thrust bush may consist of a single material having a Young's modulus of at least about 2 E8 $N/m^2$.

In other embodiments, a perpendicularity between the shaft and the lower thrust bush may include a runout of a few micrometers from the outer diameter to the inner diameter of a thrust plate. In still other embodiments, the FDB may further include a top thrust bearing formed from a second material that is softer than the single material, and the second material may comprise bronze, brass or a combination thereof. The media disks can be mounted to a spindle, and a portion of the spindle may extend between the shaft and the nest.

As described herein, embodiments of the lower thrust bush and a FDB shaft may be formed as a single, integral piece. The single part may include a high Young's modulus material, such as steel. The top thrust bush ring can be made with a softer material, such as bronze or brass, and either loose fit or tight fit on the top portion of the FDB shaft.

The perpendicularity of the lower thrust bush may be well controlled due to the one piece design. In addition, most applications for the 3.5 inch form factor (or larger) HDD are mounted with the HDD in an up-side-up orientation. Thus, most of start-stop contact (CSS) of the FDB occurs on the lower thrust bearing. Good control of perpendicularity and the steel material of the lower thrust bush reduce the FDB wear dramatically during the CSS.

Referring again to FIG. 3, the hard disk drive assembly 100 may include one or more disks 111 rotated at high speeds by a spindle motor (not shown) during operation. Concentric magnetic data tracks 113 are formed on either or both of the disk surfaces to receive and store information.

Embodiments of a read/write slider 110 having read/write heads may be moved across the disk surface by an actuator assembly 106, allowing the slider 110 to read and/or write magnetic data to a particular track 113. The actuator assembly 106 may pivot on a pivot 114. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write sliders 110 periodically reference servo patterns recorded on the disk to ensure accurate slider positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. Unlike spokes however, servo sections 112 form a subtle, arc-shaped path calibrated to substantially match the range of motion of the read/write slider 110.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A disk drive, comprising:
an enclosure;
a media disk rotatably mounted to the enclosure; and
a fluid dynamic bearing (FDB) mounted between the enclosure and the media disk, the FDB comprising an integrally formed shaft and lower thrust bush formed together from a single material, and the single material has a Young's modulus of at least about 2 E8 N/m$^2$.

2. The disk drive of claim 1, wherein the media disk comprises a form factor in excess of 2.5 inches to about 15 inches.

3. The disk drive of claim 1, wherein the media disk comprises a form factor of at least about 3.5 inches to about 15 inches.

4. The disk drive of claim 1, wherein the enclosure comprises a nest extending therefrom, and the shaft and lower thrust bush are seated in and make contact with the nest on axial and radial sides thereof.

5. The disk drive of claim 4, wherein axial and radial abutting surfaces of the nest and the shaft and lower thrust bush are substantially perpendicular and are not conical.

6. The disk drive of claim 4, wherein the nest has a nest axial dimension that is less than an axial dimension of the shaft, and greater than an axial dimension of the lower thrust bush.

7. The disk drive of claim 4, wherein the nest has a nest inner radial dimension, the shaft has a shaft outer radial dimension that is less than the nest inner radial dimension, and the lower thrust bush has a bush outer radial dimension that is substantially similar to the nest inner radial dimension.

8. The disk drive of claim 1, wherein the shaft and lower thrust bush are not separate parts that are joined together, and they are not formed from different materials.

9. The disk drive of claim 1, wherein a perpendicularity between the shaft and the lower thrust bush comprises a runout of a few micrometers from the outer diameter to the inner diameter of a thrust plate.

10. The disk drive of claim 1, wherein the FDB further comprises a top thrust bearing formed from a second material that is softer than the single material.

11. The disk drive of claim 10, wherein the second material comprises bronze, brass or a combination thereof.

12. The disk drive of claim 10, wherein the top thrust bearing comprises a top thrust bush ring having either a loose fit or a tight fit on an upper portion of the shaft.

13. The disk drive of claim 1, wherein the media disk is mounted to a spindle, the spindle is rotatably mounted to the FDB, the enclosure comprises a nest extending therefrom, the shaft and lower thrust bush are seated in and axially and radially abut the nest, and a portion of the spindle extends between the shaft and the nest.

14. A disk drive, comprising:
an enclosure having a base with a nest extending therefrom, and a top cover coupled to the base;
a plurality of media disks rotatably mounted to the enclosure, each media disk having a form factor of at least about 3.5 inches; and
a fluid dynamic bearing (FDB) mounted between the enclosure and the plurality of media disks, wherein the FDB comprises an integrally formed shaft and lower thrust bush, the shaft and lower thrust bush are seated in and make contact with the nest, and the FDB further comprises a top thrust bearing formed from a material that is softer than the shaft and lower thrust bush, and the top thrust bearing comprises bronze, brass or a combination thereof.

15. The disk drive of claim 14, wherein abutting axial and radial surfaces of the nest and the shaft and lower thrust bush are substantially perpendicular and are not conical, and the nest has a nest axial dimension that is less than an axial dimension of the shaft, and greater than an axial dimension of the lower thrust bush.

16. The disk drive of claim 14, wherein the formed shaft and lower thrust bush consist of a single material having a Young's modulus of at least about 2 E8 N/m$^2$.

17. The disk drive of claim 14, wherein a perpendicularity between the shaft and the lower thrust bush comprises a runout of a few micrometers from the outer diameter to the inner diameter of a thrust plate.

18. A disk drive, comprising:
an enclosure having a nest extending therefrom;
a media disk rotatably mounted to the enclosure, the media disk having a form factor of at least about 3.5 inches to about 15 inches;
a fluid dynamic bearing (FDB) mounted between the enclosure and the media disk, the FDB comprising an integrally formed shaft and lower thrust bush formed together from a single material, such that the shaft and lower thrust bush are not separate parts that are joined together, and they are not formed from different materials, and the single material comprises a material having a Young's modulus of at least about 2 E8 N/m$^2$;

the shaft and lower thrust bush are seated in and make contact with the nest on axial and radial sides thereof, and axial and radial abutting surfaces of the nest, shaft and lower thrust bush are substantially perpendicular;

the FDB further comprises a top thrust bearing formed from a second material that is softer than the single material, and the second material comprises bronze, brass or a combination thereof; and a perpendicularity between the shaft and the lower thrust bush comprises a runout of a few micrometers from the outer diameter to the inner diameter of a thrust plate.

* * * * *